Patented Sept. 4, 1951

2,567,085

UNITED STATES PATENT OFFICE 2,567,085

PRESERVATION OF FOODSTUFFS

Leonard S. Stoloff, New Bedford, Mass., assignor of one-half to Merck & Co., Inc., Rahway, N. J., a corporation of New Jersey, and one-half to Krim-Ko Corporation, Chicago, Ill., a corporation of Illinois No Drawing. Application August 6, 1949, Serial No. 109,065

8 Claims. (Cl. 99—150)

This invention is concerned generally with the preservation of foodstuffs. More particularly, it relates to the method which comprises treating foodstuffs, prior to freezing, with a solution containing an extractive of a seaweed of the genus Rhodophyceae and an ascorbic acid, thereby extending the storage life of the frozen foodstuff.

It is well known that many foodstuffs, when subjected to freezing temperatures undergo dehydration and oxidation of the surface layers. When such foodstuffs are stored in the frozen state they tend to discolor and often develop bad taste and odor. Moreover, when such foodstuffs are thawed, further discoloration and deterioration occurs rapidly.

Attempts have been made to avoid this deterioration by treating food products prior to freezing with various coating materials to protect the surface of the foodstuff from oxidation and dehydration. These prior art technics have, however, proved to be unsatisfactory for avoiding discoloration during prolonged periods of storage, and in the case of fish, particularly, have failed to retard, to any considerable extent, the development of rancidity. For example, when mackeral fillets are treated with a solution of a coating compound, such as Irish moss extractive used alone, and the coated fillets are frozen and stored in the frozen state, the stored fillets develop sufficient rancidity to be unacceptable after only five months' storage.

It may be noted that fatty fish have posed an especially troublesome problem for processors wishing to freeze the fish in season and store it successfully for later sales. The reason for the loss in quality during storage of fish is the development of rancidity in the fat and flesh of the fish and in the fish oil, particularly that exposed to the air. In order to minimize this surface oxidation, some fish, such as mackeral, have been frozen in the round, but such fish, when frozen and stored according to conventional methods, ordinarily become rancid and unfit for use after a few months' storage. It is ordinarily preferred, however, to freeze and store fish as fillets since the fillets are more economical to freeze and store than the whole fish. Moreover, fillets can be merchandized with more consumer appeal. But, according to the trade, frozen fillets cannot be kept in storage more than three months, and this period is too short for favorable commercial operations.

Attempts have been made to avoid the development of rancidity due to the oxidation of the fish oil by dipping the fish prior to freezing in solutions of antioxidants such as ascorbic acid, ethyl, n-propyl, n-butyl, and hexyl gallates, sodium gallate, ethanol ammonium gallate, thiodipropionic acid, dodecyl thiodipropionate, thiourea, citric acid, and tartaric acid. None of these antioxidant dips were, however, found to be effective in avoiding the development of rancidity after prolonged storage of the frozen fish.

It is now discovered, however, that when foodstuffs, and in particular, fish or fish fillets are dipped in a coating solution containing both an extractive of a seaweed of the genus Rhodophyceae and an ascorbic acid, and the coated foodstuff frozen and stored in the frozen state that substantially no deterioration occurs even after one year's storage.

The Rhodophyceae extractives which may be utilized in said coating solutions include those obtained from the well-known Irish moss (*Chondrus crispus*) harvested from the submarine beds along the Atlantic sea coast, the *Gigartina stellata* extractives being produced in England and Norway, extractives of *Hypnea museiformis*, *Gigartina acicularis* and the like. I ordinarily prefer to employ the refined Irish moss extractive known by the trade name "Krim-Ko-Gel."

The ascorbic acids which may be used in conjunction with the Rhodophyceae extractives include ascorbic acid, isoascorbic acid, glucoheptoascorbic acid and the like. Other reductones, that is compounds having an ene-diol structure such as reductic acid, may be utilized instead of the ascorbic acids.

It is desired to emphasize that treating fish, prior to freezing, with a coating solution containing a Rhodophyceae extractive such as Irish moss extractive alone, or with a coating solution containing ascorbic acid but no Irish moss extractive, has failed to extend the storage life of the frozen fish beyond approximately five months. Moreover, coating solutions containing Irish moss extractive together with the antioxidants, lecithin or thiodipropionic acid, when used to treat fish prior to freezing, have failed to prolong the storage life of the frozen fish beyond a three-month storage period. It is indeed surprising, therefore, that the storage life of frozen foodstuffs and, in particular, that of frozen fish fillets is extended to a period of over one year by pre-treating said foodstuffs with a solution containing a Rhodophyceae extractive such as Irish moss extractive and an ascorbic acid.

It is believed that this advantageous synergistic action between ascorbic acid and the Rhodophyceae extractives is due to the fact that the viscosity created by the Rhodophyceae extractive causes the fish to be completely coated with a film of appreciable dimensions and that an antioxidant system present in the Rhodophyceae extractive is activated by the more sensitive ascorbic acid. It is to be understood, however, that I do not wish to confine myself to any theory of operation, my discovery being separate and independent of such theoretical considerations.

It is clear that the substantial increase in storage life of frozen fish from five months to over one year, is of great practical importance. It ensures that the fish, caught in season, can be marketed throughout the year period, until the time that the fish again become plentiful. Moreover, fish treated prior to freezing with the solutions herein described, have been found to be of the first quality even after being stored for one year in the frozen state.

The solution used in treating the foodstuff, prior to freezing, is ordinarily prepared by first dissolving the Rhodophyceae extractive in water and adding thereto an aqueous solution of an ascorbic acid, although any other method of forming an aqueous solution of these components may be employed if desired. The concentration of the components in the coating solution can be varied over wide limits depending on the temperature and viscosity of the solution, the time of dipping or draining and the like. I ordinarily employ an aqueous coating solution containing between about 0.2 and 3.0% of the Rhodophyceae extractive (preferably about 0.5% by weight of the refined extractive of Irish moss known as Krim-Ko-Gel) and containing approximately 0.3% of a reductone such as ascorbic acid based on the weight of the total coating solution. I have found it convenient to prepare such an aqueous coating solution (containing Irish moss extractive and ascorbic acid) by first dissolving one part of Irish moss extractive in 189 parts of water and then adding to this solution ten parts of a 6.0% aqueous solution of ascorbic acid (i. e. 0.6 part of ascorbic acid in 9.4 parts of water) all parts being by weight. The resulting coating solution thus contains 0.5% of Irish moss extractive and 0.3% of ascorbic acid.

The foodstuff is then treated prior to freezing, with the above coating solution containing Irish moss extractive and ascorbic acid. The foodstuff is ordinarily dipped in the solution and then allowed to drain to remove excess solution. Other methods of treatment such as spraying the solution may be employed, however, if desired. In the case of fish fillets, the complete procedure consists of first filleting, washing the fillets, draining, weighing, dipping in the coating solution, draining, wrapping, packaging and then freezing.

It has been found that foodstuffs, and in particular, fish, treated with this coating material and then frozen are substantially unaffected in quality even after one year's storage in the frozen state, whereas untreated foodstuffs ordinarily show deterioration after three month's storage and, in the case of frozen fish, prior attempts at prolonging the storage life thereof have not succeeded in extending said life beyond approximately five months.

It is desired to emphasize that the presently disclosed solutions have been found to be generally applicable for treating foodstuffs prior to storage to prolong the storage life thereof. For example, fresh vegetables may be dipped, immediately after picking, in these solutions whereby said vegetables are protected from deterioration and retain their fresh-picked flavor even after prolonged storage time required for shipment and marketing thereof. Likewise fruits such as apples which are ordinarily peeled and cut prior to baking may be treated after the peeling and cutting operations with these coating solutions and the resulting treated fruit stored for a prolonged period of time without any substantial discoloration or deterioration of the fruit taking place. Various meat products, such as chicken, various vegetable products and fruits may be pre-treated with a coating of these solutions containing Rhodophyceae extractive and a reductone such as ascorbic acid, and the foodstuff frozen and stored for prolonged periods in the frozen state without any substantial deterioration during said storage or upon thawing of said foodstuffs prior to use.

The following example illustrates a method of carrying out the present invention, but it is to be understood that this example is given for purposes of illustration and not of limitation.

*Example I*

The following test was made to determine the effectiveness, in prolonging the storage life of the frozen fish, of pretreating mackerel fillets with a coating solution containing Irish moss extractive and ascorbic acid. The mackerel fillets treated with this solution were frozen and the storage life of the frozen fillets compared with that of frozen fillets pretreated as follows: (1) Untreated fillets; (2) Fillets pretreated with a solution containing Irish moss extractive alone; (3) Fillets pretreated with a solution containing Irish moss extractive and lecithin.

The mackerel used in this test were less than twelve hours old when purchased. They were an early season lean-meat lot of fairly large fish (1.5 lb.) averaging 4.6 percent fat. Before processing the fish were kept in cold storage (28° F.) for several hours.

The fillets were cut from the round fish, rapidly washed in fresh tap water to remove the excess blood, drained, weighed to approximately one-pound portions, dipped into an aqueous solution containing 1% Irish moss extractive and 0.2% ascorbic acid, and finally drained for approximately 15 seconds on a stainless steel screen.

After dipping and draining, the fillets were wrapped in cellophane, with the aid of a mold, before being placed in individual one-pound type waxed cardboard boxes. Twelve one-pound packages were prepared as described above.

Twelve additional packages were prepared as controls and contained fillets which were not subjected to treatment with the coating solution.

Twelve packages were prepared which contained fillets dipped in a 1% aqueous solution containing only Irish moss extractive.

Twelve more packages were prepared which contained fillets dipped in an aqueous solution containing 1% Irish moss extractive and 0.2% lecithin.

Four packages, one package for the fish treated with Irish moss extractive and ascorbic acid, one for the fish treated with Irish moss extractive alone, one for the fish treated with Irish moss extractive and lecithin, and one for the untreated fish, were packed together in each of twelve waxed master cartons, and in these containers the contents were frozen in an air blast freezer (−25° F.) before being placed in commercial cold storage (0° F.).

At approximately monthly intervals a master carton was removed from storage for inspection and the contents were tested. The four individual packages were placed on a bench, where the fish were thawed by an electric fan. Before observations were made, all identifying marks were removed and a number was assigned serially to each package according to its random removal from the master cartons. Then the packages were opened and observed for appearance and odor. Then examinations for appearance, odor and flavor were made on a cooked fillet from each package. These fillets were baked in individual pans for 20 minutes at 340° F.

The testing panel consisted of three to five experienced fish tasters. Observations were made for qualities that would render the product unfit for customer acceptance. Each member of the panel made his observations first on the thawed, then on the cooked samples. After all had completed a series of observations, notes were compared for each sample and a consensus was made, averaging opinions.

The results obtained on these tests, made at approximately monthly intervals over a one-year period, may be summarized as follows: (1) The untreated fillets were unacceptable after the third month; (2) Those treated with the solution containing 1% Irish moss extractive and 0.2% lecithin were unacceptable after the fourth month; (3) Those treated with a solution containing 1% Irish moss extractive alone were unacceptable at the end of the sixth month; (4) Those treated with a solution containing 1% Irish moss extractive and 0.2% ascorbic acid were of excellent quality even after a storage period of over one year.

Modifications may be made in carrying out the present invention without departing from the spirit and scope thereof. Insofar as these changes and modifications are within the purview of the annexed claims, they are to be considered as part of my invention.

I claim:

1. In a method for extending the storage life of foodstuffs the step which consists of treating said foodstuff prior to storage with an aqueous solution of a Rhodophyceae extractive and a reductone.

2. In a method for extending the storage life of frozen foodstuffs the step which consists of treating said foodstuff prior to freezing with an aqueous solution of approximately 0.2 to 3.0% Rhodophyceae extractive and approximately 0.3% of a reductone.

3. In a method for extending the storage life of frozen foodstuffs the step which consists of treating said foodstuff prior to freezing with an aqueous solution of Irish moss extractive and ascorbic acid.

4. In a method for extending the storage life of frozen fish the step which consists of treating the fish, prior to freezing, with an aqueous solution of Irish moss extractive and ascorbic acid.

5. In a method for extending the storage life of frozen fish fillets the step which consists of dipping said fillets, prior to freezing, in a solution of approximately 0.5% Irish moss extractive and approximately 0.3% ascorbic acid.

6. A method for extending the storage life of frozen mackerel fillets which consists of the steps of filleting, washing the fillets, draining, dipping the washed and drained fillets in an aqueous coating solution of approximately 0.5% Irish moss extractive and approximately 0.3% ascorbic acid, allowing the excess coating solution to drain from said fillets, packaging the resulting fillets and freezing at a temperature of approximately −25° F., thereby freezing said fillets, and storing said fillets at about 0° F.

7. An aqueous coating solution for treating foodstuffs consisting of water, Rhodophyceae extractive, and a reductone.

8. An aqueous coating solution for treating foodstuffs consisting of water, Irish moss extractive and ascorbic acid.

LEONARD S. STOLOFF.

REFERENCES CITED

The following references are of record in the file of this patent:

UNITED STATES PATENTS

| Number | Name | Date |
|---|---|---|
| 2,377,029 | Norris | May 29, 1945 |
| 2,462,760 | Mitchell | Feb. 22, 1949 |
| 2,470,281 | Allingham | May 17, 1949 |

FOREIGN PATENTS

| Number | Country | Date |
|---|---|---|
| 1,997 | Great Britain | of 1875 |

OTHER REFERENCES

"Chemical Abstracts," Fornin, 31 8037[9] and 8038[1].

"Food Industries," Gray et al., 11 (1939), 626, 627, and 628.

"Quick Frozen Foods," April 1948, pages 68, 69, 70, 72.